United States Patent [19]

O'Lenick, Jr. et al.

[11] Patent Number: 4,873,294

[45] Date of Patent: Oct. 10, 1989

[54] MIXTURE OF CATIONIC BENZENE CARBOXYLATE POLYMERS FROM THE REACTION OF HALOACETYL TERMINATED POLY(ETHER-ESTERS) WITH TERMINAL QUATERNIZING AGENTS

[75] Inventors: Anthony J. O'Lenick, Jr., Lilburn; Joseph J. Fanelli, Alpharetta, both of Ga.

[73] Assignee: GAF Corporation, Wayne, N.J.

[21] Appl. No.: 207,419

[22] Filed: Jun. 16, 1988

[51] Int. Cl.$^4$ .................... C08G 63/18; C08G 63/46; C08G 63/66; C08G 63/68
[52] U.S. Cl. .................. 525/419; 525/437; 525/448; 528/271; 528/295; 528/296; 528/297; 528/300; 528/301; 528/305
[58] Field of Search ............... 525/419, 448, 437

[56] References Cited

U.S. PATENT DOCUMENTS 3,476,697 11/1969 Clements .................. 525/448
3,580,966 5/1971 Engelhard et al. ........... 525/418

FOREIGN PATENT DOCUMENTS 0125245 9/1979 Japan .................. 525/448
0611911 6/1978 U.S.S.R. .............. 525/418

Primary Examiner—John Kight
Assistant Examiner—Frederick Krass
Attorney, Agent, or Firm—Marilyn J. Maue; Joshua J. Ward

[57] ABSTRACT

The invention relates to mixtures of cationic benzene carboxylate polymers, a method for their preparation and use, which polymers are defined by the formula

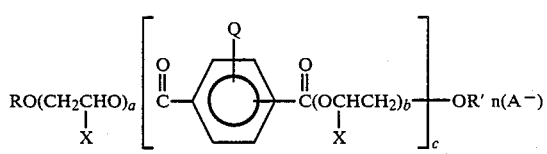

wherein R and R' are selected from the group consisting of alkyl or alkenyl having from 1 to 20 carbon atoms, aryl,

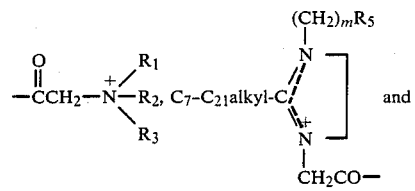

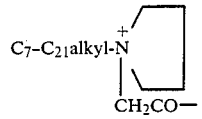

with the proviso that at least one of R and R' is quaternized;
Q is hydrogen, $SO_3$-alkali metal, $SO_3H$, COOH or COO-alkali metal, between about 55% and about 90% of Q in said mixture being hydrogen and between about 10% and about 45% of Q in said mixture being other than hydrogen;
a and b each have a value of from 1 to 200, except that the sum of a+b is at least 25;
X is hydrogen, lower alkyl or mixtures thereof in random or block distribution when a and/or b is greater than 3;
c has a value of from 2 to 10,000;
$R_1$, $R_2$ and $R_3$ each contain from 1 to 22 carbon atoms and are alkyl, hydroxy alkyl or alkylamido lower alkyl;
$R_5$ is

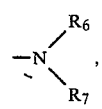

—OH, —$OCOR_1$ or —$OR_1$;
$R_6$ is hydrogen or —$COR_1$;
$R_7$ is hydrogen, —$(CH_2)_mOCOR_1$, —$(CH_2)_mNH_2$,

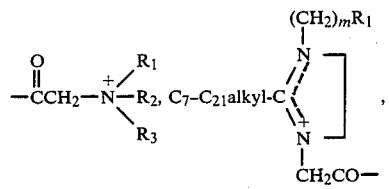

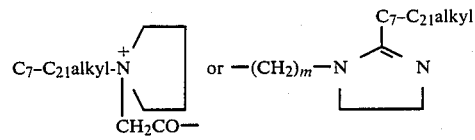

m has a value of from 0 to 3;
A is a halide anion or sulfonate, sulfate or alkali metal and
n has a value equal to the number of quaternized nitrogen atoms in the molecule.

10 Claims, No Drawings

MIXTURE OF CATIONIC BENZENE CARBOXYLATE POLYMERS FROM THE REACTION OF HALOACETYL TERMINATED POLY(ETHER-ESTERS) WITH TERMINAL QUATERNIZING AGENTS

In one aspect the invention relates to novel cationic polymers and in other aspects to the preparation of said polymers and their use as anti-soil deposition, softening and antistatic agents and as dye auxiliaries for fabrics.

THE INVENTION

In accordance with this invention there is provided a mixture of cationic benzene carboxylate polymers having the structure

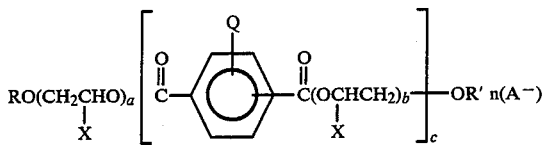

wherein R and R' are selected from the group consisting of alkyl or alkenyl having from 1 to 20 carbon atoms, aryl,

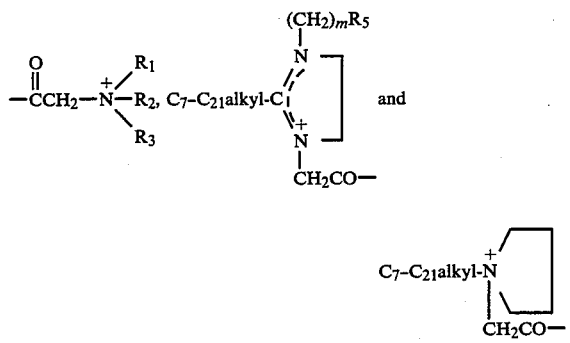

with the proviso that at least one of R and R' is quaternized;
Q is hydrogen, $SO_3$-alkali metal, $SO_3H$, COOH or COO-alkali metal, at least 25% of Q in said mixture being hydrogen;
a and b each have a value of from 1 to 200, except that the sum of a+b is at least 25;
X is hydrogen, lower alkyl or mixtures thereof in random or block distribution when a and/or b is greater than 3;
c has a value of from 2 to 10,000;
$R_1$, $R_2$ and $R_3$ each contain from 1 to 22 carbon atoms and are alkyl, hydroxy alkyl or alkylamido lower alkyl;
$R_5$ is

—OH, —$OCOR_1$ or —$OR_1$;
$R_6$ is hydrogen or —$COR_1$;

$R_7$ is hydrogen, —$(CH_2)_mOCOR_1$, —$(CH_2)_mOR_1$, —$(CH_2)_mNH_2$,

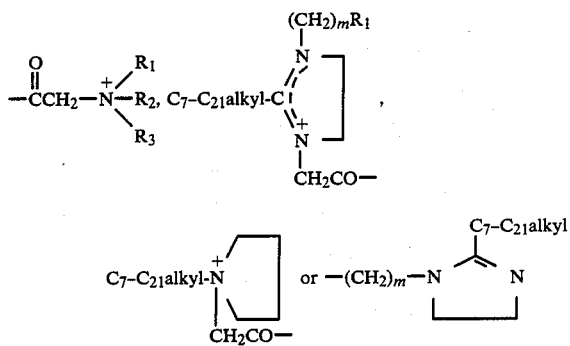

m has a value of from 0 to 3;
A is a halide, sulfonate, sulfate or alkali metal anion and n has a value equal to the number of quaternized nitrogen atoms in the molecule.

Of the above polymer mixtures, those wherein c has a value of from 50 to 5,000 and wherein

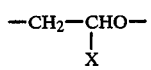

is a mixture of ethylene oxide and propylene oxide in random or block distribution and a and b each have a value of from 50 to 100, are preferred and those wherein Q is —$SO_3Na$ or —$SO_3K$ are most preferred. The mixtures of this invention include at least 2, more often at least 4, components having the ionic phenyl carboxylate polymer structure. These mixtures are more stable and have longer lasting anti soil deposition properties than can be achieved with individual components of the mixture.

The ratio of substituted to non-substituted benzene carboxylate groups in the present polymer mixture is vital to the product's substantive properties and is preferably between about 2:1 and about 1:10. The mixture must have sufficient solubility or dispersability to provide uniform mixtures with water so as to be compatable with a laundry wash or an aqueous mixture for coating a continuous or non-continuous film on a fabric. Conversely, it should be sufficiently insoluble in water to insure substantially complete exhaust onto a cotton or polyester fabric during treatment. Generally, the present mixtures containing at least 50% of non-substituted phthalate groups display such an affinity for polyester. The present mixtures are non-yellowing, anti soil deposition agents which additionally provide softening and antistatic properties to a fabric when applied thereto during a washing cycle, when incorporated into a dry cleaning solution or when padded, sprayed or otherwise applied directly onto the fabric prior to cleaning. Textiles treated with the present polymer mixtures can be laundered or dry cleaned in less than half the time required for normal cleaning and are particularly useful for coating fabrics which are subject to heavy soiling or in laundering or rinsing solutions of fabrics heavily soiled with industrial oil or grease. Also, the fabrics treated with these polymeric mixtures, before or after cleaning, are softened and possess antistatic properties.

In addition to the above benefits, the present quaternized mixtures containing phthalate groups substituted with —SO₃-alkali metal can be used as dye auxiliaries to provide additional sites on polyester fabric which hold the dye and stabilize the color of the dyed fabric.

The present cationic polymer mixtures are generally applied to fabrics in from about 5 to about 30% aqueous mixtures, suspensions or dispersions, preferably from about 10 to 20% mixtures, by any of the above or other known techniques, e.g. dipping, rolling, exhausting, etc. However, it is to be understood that solutions of the present mixtures in organic inert solvents such as halogenated alkanes, e.g. trichloroethane, and others can also be employed. The residual coating on the fabric can range from about 0.5 mils to about 2.0 mils, preferably from about 0.75 mils to about 1.5 mils as a continuous or discontinuous thin film, coating or impregnant. However lighter or heavier coatings can be employed as desired.

In rinsing solutions or in washing or dry cleaning solutions, the present mixture can be employed in concentrations as low as about 0.01% of the cleansing medium to provide the benefits expressed above. Other conventional application processes and methods of treating fabrics are also useful and will become apparent from the teaching of this disclosure.

The cationic mixtures of this invention are prepared by reacting a mixture of alcohol esters having the formula

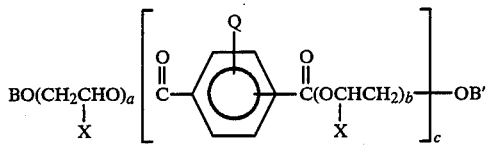

wherein X, Q, a, b, and c are as defined above and B and B' are hydrogen, an alkyl or alkenyl radical of from 1 to 20 carbon atoms, or aryl with the proviso that at least one of B and B' is hydrogen with a haloacetic acid having the formula YCH₂COOH wherein Y is Cl, Br or I, preferably Cl, to produce the corresponding halogenated polymer having the formula

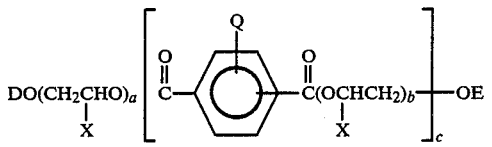

wherein D and E are hydrogen, an alkyl or alkenyl radical of from 1 to 20 carbon atoms, aryl, or —CO—CH₂Y and haloacetyl mixtures thereof, with the proviso that at least one of D and E is said haloacetyl radical. The alcohol polyester mixtures of this reaction are known and commercially available as MILASE T and MILASE HPA, supplied by Imperial Chemical Industries; ALKARIL QC-J, supplied by Alkaril Chemicals Inc., a subsidiary of GAF Chemicals Corporation; SCOTCH GARD FC-226, supplied by Minnesota Mining and Manufacturing Company; POMOCO R-302 supplied by Piedmont Chemical Co. and ZELCON-TGS supplied by E. I. duPont de Nemours Co., Inc. Alternatively the above alcohol polyester reactants can be prepared by alkoxylating a benzene mono-, di- or tri-carboxylic acid of the formula

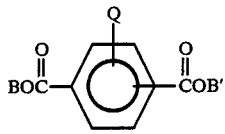

wherein Q, B and B' are as defined above, with a polyalkylene glycol of the formula

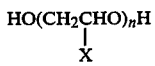

wherein X is as defined above and n has a value of from 1 to 200 at a temperature of from about 160° C. to about 250° C.

The mixture of the alcohol esters is reacted with the haloacetic acid at a temperature of between about 130° C. and about 230° C. under a pressure of from about 22 mm Hg to about atmospheric pressure for a period of between about 3 and about 20 hours. Preferred conditions for this reaction include a temperature of between about 140° C. and about 210° C., under atmospheric pressure and reaction time of 5 to 10 hours. The reaction is effected with constant agitation in the presence of an acid esterification catalyst, such as for example, p-toluene sulfonic acid, phosphoric acid or hydrogen chloride. Other esterification catalysts such as titanium esters, organo titanates, organic tin catalysts and metallic tin are also suitable.

The haloesterified product mixture is then quaternized with a tertiary amine selected from the group of

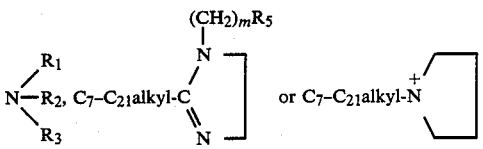

wherein R₁, R₂, R₃; R₅ and m are as defined above, at a temperature of between about 100° C. and about 200° C. under atmospheric pressure for a period of from about 3 to about 20 hours. Preferred conditions for the quaternization reaction include a temperature of 130° to 170° C. under atmospheric pressure for a period of from about 5 to about 10 hours.

The product produced by the above quaternization is the halide salt, preferably the chloride salt, of the quaternized product

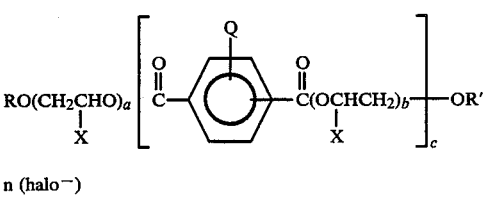

n (halo⁻)

in which the halide anion can be ion exchanged by contact with a suitable sulfonate or sulfonic acid or organo metal salt. Examples of suitable sulfonates include 5-sulfodimethyl isophthalate; 5-sulfoisophthalic acid; 4-sulfophthalic anhydride; 4-sulfo-1,8-naphthalic anhydride; 4-sulfophthalic acid; 4-sulfo-1,8-naphthalic diacid; the sodium, potassium or lithium salts thereof and their intermixtures.

Having thus described the product, its preparation and use, reference is now had to the accompanying examples which illustrate preferred embodiments thereof but which are not to be construed as limiting to the scope of the invention as more broadly set forth above and in the appended claims.

The reactants in the following examples involve, for reaction A, contacting a mixture of a phthalic acid compound of the structure

  (i)

or a lower alkyl or alkenyl or aryl ester thereof with a glycol of the structure

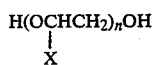  (ii)

to provide a mixture of the corresponding alkoxylated addition product; for reaction B, contacting the product mixture of reaction A with chloroacetic acid to provide the corresponding mixture of chloromethyl esters and, for reaction C, contacting the product mixture of reaction B with a tertiary amine (iii) of the formulae

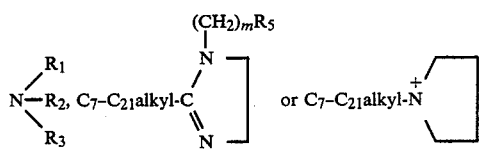

to provide the corresponding mixture of quaternized phenyl carboxylate polymer chlorides of this invention.

A—Preparation of the Alkoxylated Phenyl Carboxylic Acid

EXAMPLE 1

To a 3-necked glass reaction flask equipped with a nitrogen sparge and a Dean Stark trap was added 41.5 grams of terephthalic acid, 59 grams of dimethyl sodium sulfoisophthalate and 1675 grams of ethylene oxide having the formula $OH(CH_2CH_2O)_{76}H$. These reactants were mixed and heated to $210\pm5°$ C. for a period of about 7 hours under nitrogen sparge, during which time at least 95% of the theoretical amount of water is distilled off. After the reaction was completed, the remaining distilland was recovered for further treatment. The liquid distilland can be solidified at room temperature, ground to a particulate solid and stored for subsequent use or it can be directly subjected to esterification with haloacetic acid at about the temperature of distillation. The product of this example is a mixture containing the following compounds.

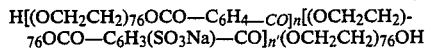

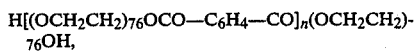

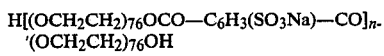

where the sum of n+n' is 10, and where n and n' in one of the products are each 5, and the number average molecular weight of the mixture is about 38,360.

EXAMPLE 2

Example 1 was repeated except that 74.7 grams of terenphthalic was employed with 11.8 grams of dimethyl sodium sulfoisophthalate and 2200 grams of alkoxylate having the formula $OH(CH_2CH_2O)_{100}H$. The product of this example is a mixture containing compounds having the following structure:

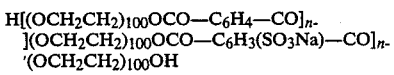

where the sum of n+n' is 5 and where, in one of the compounds, n is 4 and n' is 1. The number average molecular weight of the mixture is 31,700.

EXAMPLE 3

Example 1 is repeated except that 35 grams of trimellitic acid, 49.8 grams of terephthalic acid, 23.6 grams of dimethyl sodium sulfoisophthalate and 5,150 grams of a propylene glycol ethylene glycol mixture having the formula

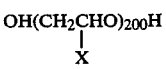

was employed. The product of this example is a mixture containing compounds having the structure:

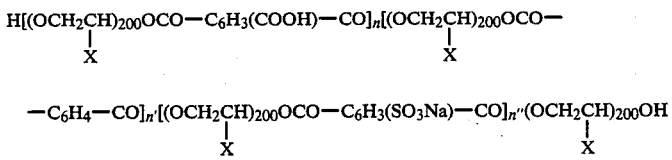

where the sum of n+n''n'' is 4 and where, in one of the compounds, n is 0.8, n' is 2.4 and n'' is 0.8. The molecular weight of the mixture is 62,880.

EXAMPLE 4

Example 1 is repeated except that 35 grams of trimellitic acid and 66.4 grams of terephthalic acid is reacted with 118 grams of propylene oxide having the formula

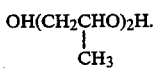

The product of this example is a mixture containing compounds having the structure:

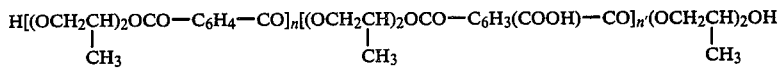

where the sum of n+n' is 50 and where, in one of the compounds, n is 40 and n' is 10. The molecular weight of the mixture is 14,640.

EXAMPLE 5

Example 1 was repeated except that 28 grams of trimellitic acid and 49.8 grams of terephthalic acid were reacted with 1,675 grams of polyethylene oxide having the formula $OH(CH_2CH_2O)_{76}H$. The product of this example is a mixture containing compounds having the structure:

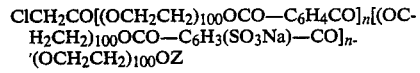

where the sum of n+n' is 10 and where, in one of the compounds, n is 4 and n' is 6. The molecular weight of the mixture is 68,686.

B—Esterification of the Product Mixtures of Reaction A

EXAMPLE 6

To a reaction flask similarly equipped as described in Example 1, 3,886 grams of the alkoxylated product mixture of Example 1 was introduced from said distillation zone. To this mixture, 10.5 grams of chloroacetic

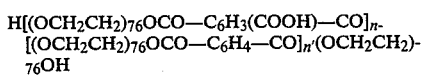

acid and 1 gram of p-toluene sulfonic acid catalyst were added. The reaction mixture was maintained at about 180° C. for about 5 hours, during which time at least 95% of the theoretical amount of water was distilled off. As described above, the liquid distilland can be solidified at room temperature, ground to a particulate solid and stored for subsequent use or it can be directly subjected to quaternization with a tertiary amine at elevated temperature. The product of this example is a mixture containing compounds having the following structure:

$ClCH_2CO[(OCH_2CH_2)_{76}OCO—C_6H_4—CO]_n[(OCH_2CH_2)_{76}OCO—C_6H_3(SO_3Na)—CO]_{n'}(OCH_2CH_2)_{76}OZ$ where the sum of n+n' is 10, Z is H or CO—CH$_2$Cl and where n and n' in one of the compounds are each 5 and Z is CO—CH$_2$Cl.

EXAMPLE 7

Example 6 is repeated except that 3,170 grams of the product mixture distilland from Example 2 is introduced from the distillation zone into the reaction flask. The product of this example is a mixture containing compounds having the following structure:

$ClCH_2CO[(OCH_2CH_2)_{100}OCO—C_6H_4CO]_n[(OCH_2CH_2)_{100}OCO—C_6H_3(SO_3Na)—CO]_{n'}(OCH_2CH_2)_{100}OZ$ wherein the sum of n+n' is 5 and Z is H or CO—CH$_2$Cl and where, in one of the compounds, n is 4, n' is 1 and Z is —COCH$_2$Cl.

EXAMPLE 8

Example 6 is repeated except that 6,288 grams of the alkoxylated product mixture distilland of Example 3 was passed directly into the reaction flask. The product of this example is a mixture containing compounds having the following structure:

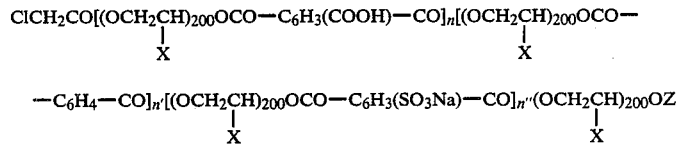

where the sum of n+n'+n'' is 4, Z is H or —COCH$_2$Cl and where, in one of the compounds, n is 0.8, n' is 2.4, n'' is 0.8, and Z is —COCH$_2$Cl.

EXAMPLE 9

Example 6 is repeated except that 1,464 grams of the alkoxylated product mixture distilland of Example 4 was passed directly from the distillation zone into the flask. The product of this example is a mixture containing compounds having the following structure:

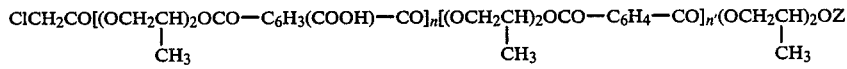

where the sum of n+n'+n'' is 50, Z is H or —COCH$_2$Cl and where, in one of the compounds, n is 10 and n' is 40 and Z is —COCH$_2$Cl.

EXAMPLE 10

Example 6 was repeated except that 3,868.6 grams of the alkoxylated product distilland from Example 5 was introduced into the flask. The product of this example is a mixture containing compounds having the following structure:

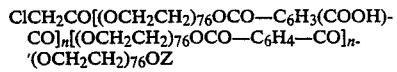

where the sum of n+n' is 10, Z is H or —COCH$_2$Cl and where, in one of the compounds, n is 4, n' is 6 and Z is —COCH$_2$Cl.

C—Quaternization of the Product Mixtures of Reaction B

EXAMPLE 11

Into a glass reaction flask similarly equipped to that described in Example 1 was introduced 21.3 grams of lauryl dimethyl amine and 3,886 grams of the distilland mixture from the distillation zone of Example 6. The reactants were mixed and held at a temperature of about 150° C. for a period of 10 hours during which time at least 95% of the theoretical amount of water was removed by distillation. The resulting product mixture was cooled to room temperature and the resulting solid mass was ground to particulate form and optionally homogenized in aqueous solution for shipment or storage.

The product of this example is a mixture containing compounds having the following structure:

$$C_{12}H_{25}N^+(CH_3)_2CH_2CO[(OCH_2CH_2)_{76}OCO-C_6H_4-CO]_n[(OCH_2CH_2)_{76}OCO-C_6H_3(SO_3Na)-CO]_{n'}(OCH_2CH_2)_{76}OZ$$

wherein the sum of $n+n'$ is 10 and Z is H, $-COCH_2Cl$ or $-COCH_2(CH_3)_2N^+C_{12}H_{25}$ and where, in one of the compounds, n and n' are each 5 and Z is $-COCH_2(CH_3)_2N^+C_{12}H_{25}$.

EXAMPLE 12

Example 11 was repeated except that 3,170 grams of the distilland product mixture of Example 7 was added to the flask. The product of this example is a mixture containing compounds having the following structure:

$$C_{12}H_{25}N^+(CH_3)_2CH_2CO[(OCH_2Cl_2)_{100}O-CO-C_6H_4-CO]_n[(OCH_2CH_2)_{100}OCO-C_6R_3(SO_3Na)-CO]_{n'}(OCH_2CH_2)_{100}OZ$$

wherein the sum of $n+n'$ is 5 and Z is H, $-COCH_2Cl$ or $-COCH_2(CH_3)_2N^+C_{12}H_{25}$ and where, in one of said compounds, n is 4, n' is 1 and Z is $-COCH_2(CH_3)_2N^+C_{12}H_{25}$.

EXAMPLE 13

Example 11 was repeated except that 6,288 grams of the distilland product mixture of Example 8 was added to the reaction flask. The product of this example is a mixture containing compounds having the following structure:

$$\overset{+}{C_{12}H_{25}N}(CH_3)_2CH_2CO[(OCH_2CH)_{200}OCO-C_6H_3(COOH)-CO]_n[(OCH_2CH)_{200}OCO-\underset{X}{|}$$

$$-C_6H_4-CO]_{n'}[(OCH_2CH)_{200}OCO-C_6H_3(SO_3Na)-CO]_{n''}(OCH_2CH)_{200}OZ$$
$$\underset{X}{|} \quad \underset{X}{|}$$

wherein X is a 50/50 mixture of EO and PO, the sum of $n+n'+n''$ is 4 and Z is H, $-COCH_2Cl$ or $-COCH_2(CH_3)_2N^+C_{12}H_{25}$ and where, in one of the compounds, n is 0.8, n' is 2.4, n" is 0.8 and Z is $-COCH_2(CH_3)_2N^+C_{12}H_{25}$.

EXAMPLE 14

Example 11 was repeated except that 1,464 grams of the distilland product mixture of Example 9 was added to the reaction flask. The product of this example is a mixture containing compounds having the following structure:

$$\overset{+}{C_{12}H_{25}N}(CH_3)_2CH_2CO[(OCH_2CH)_2OCO-C_6H_3(COOH)-CO]_n[(OCH_2CH)_2OCO-C_6H_4-CO]_{n'}(OCH_2CH)_2OZ$$
$$\underset{CH_3}{|} \qquad \underset{CH_3}{|} \qquad \underset{CH_3}{|}$$

wherein the sum of $n+n'$ is 50 and Z is H, $-COCH_2Cl$ or $-COCH_2(CH_3)_2N^+C_{12}H_{25}$ and where, in one of said compounds, n is 10, n' is 40 and Z is $-COCH_2(CH_3)_2N^+C_{12}H_{25}$.

EXAMPLE 15

Example 11 is repeated except that 3,868 grams of the distilland product mixture of Example 10 was added to the reaction flask. The product of this reaction is a mixture containing compounds having the following structure:

$$C_{12}H_{25}N^+CH_3)_2CH_2CO[(OCH_2CH_2)-_{76}OCO-C_6H_3(COOH)-CO]_n[(OCH_2CH_2)_{76}OCO-C_6H_4-CO]_{n'}(CH_2CH_2)-_{76}OZ$$

wherein the sum of $n+n'$ is 10 and Z is H, $-COCH_2Cl$ or $-COCH_2(CH_3)_2N^+C_{12}H_{25}$ and where, in one compound, n is 4, n' is 6 and Z is $-COCH_2(CH_3)_2N^+C_{12}H_{25}$.

EXAMPLE 16

Example 11 is repeated except that 26.8 grams of the tertiary amine having the formula

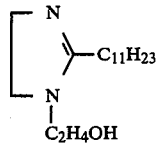

is substituted for lauryl dimethyl amine. The product of this example is a mixture of compounds similar to those described for Example 11 except that one terminal group is

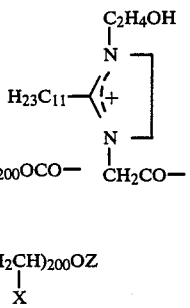

and the remaining terminal group is the same or is hydrogen or —COCH₂Cl, i.e. a mixture of compounds having the formula:

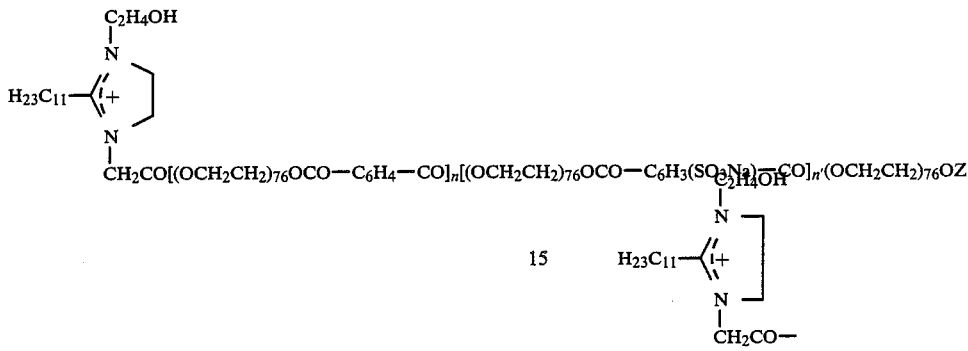

where the sum of n+n' is 10 and Z is H, —COCH₂Cl or

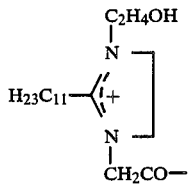

and wherre, in one of the compounds, n and n' are each 5 and Z is

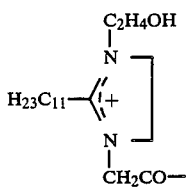

EXAMPLE 17

Example 16 is repeated except that 3,170 grams of the distilland product mixture of Example 7 was added to the reaction flask. The product of this example is a mixture similar to the product mixture described for Example 12 except that one terminal group is

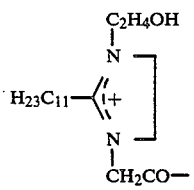

and the remaining terminal group is the same or is hydrogen or —COCH₂Cl.

EXAMPLE 18

Example 16 is repeated except that the distilland product mixture of Example 8 is added to the reaction flask. The product of this example is a mixture similar to the product mixture described for Example 13 except that one terminal group is and the remaining terminal group is the same or H or —COCH₂Cl.

EXAMPLE 19

Example 16 is repeated except that the distilland product mixture of Example 9 is added to the reaction flask. The product is a mixture of compounds similar to the product mixture described for Example 14 except that one terminal group is

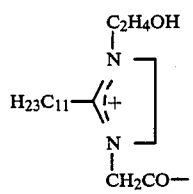

and the remaining terminal group is the same or is H, —COCH₂Cl.

EXAMPLE 20

Example 16 is repeated except that 3,868 grams of the distilland product mixture of Example 10 is added to the reaction flask. The product of this example is a mixture similar to the product mixture of Example 15 except that one terminal group is

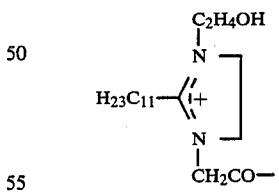

and the remaining terminal group is the same or is H, —COCH₂Cl.

EXAMPLE 21

Example 16 is repeated except that 32.6 grams of the tertiary amine having the formula

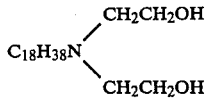

is substituted for lauryl dimethyl amine. The product of this reaction is a mixture similar to the product mixture described for Example 16 except that one terminal group is

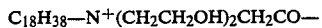

and the remaining terminal group is the same or is hydrogen, or —COCH$_2$Cl.

EXAMPLE 22

Example 21 is repeated except that 3,170 grams of the distilland product mixture of Example 7 is added to the reaction flask the product is a mixture similar to the product mixture described for Example 12 except that one terminal group is

and the remaining terminal group is the same or is hydrogen, or —COCH$_2$Cl.

EXAMPLE 23

Example 21 is repeated except that 6,288 grams of the distilland product mixture of Example 8 is added to the reaction flask. The product is a mixture similar to the product mixture of Example 13 except that one terminal group is

and the remaining terminal group is the same or is hydrogen or —COCH$_2$Cl.

EXAMPLE 24

Example 21 is repeated except that 1,464 grams of the distilland product mixture of Example 9 is added to the reaction flask. The product of this example is a mixture similar to the product mixture of Example 14 except that one terminal group is

and the remaining terminal group is the same or is hydrogen or —COCH$_2$Cl.

EXAMPLE 25

Example 21 is repeated except that 3,868 grams of the distilland product mixture of Example 10 is added to the reaction flask. The product of this example is a mixture similar to the product mixture of Example 15 except that one terminal group is

and the remaining terminal group is the same or is hydrogen or —COCH$_2$Cl.

EXAMPLE 26

Example 11 was repeated except that 32.4 grams of the tertiary amine having the formula

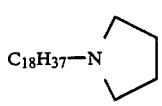

was substituted for lauryl dimethyl amine. The product of this example is a mixture similar to the product mixture of Example 11 except that one terminal group is

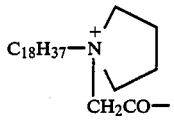

and the remaining terminal group is the same or is hydrogen or —COCH$_2$Cl.

EXAMPLE 27

Example 26 is repeated except that 3,170 grams of the distilland product mixture of Example 7 was added to the reaction flask. The product of this reaction is a mixture similar to the product mixture of Example 12 except that one terminal group is

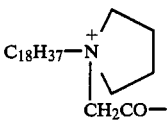

and the remaining terminal group is the same or is hydrogen or —COCH$_2$Cl.

EXAMPLE 28

Example 26 is repeated except that 6,288 grams of the distilled product mixture of Example 8 is added to the reaction flask. The product of this example is a mixture similar to the product mixture of Example 13 except that one terminal group is

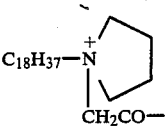

and the remaining terminal group is the same or is hydrogen or —COCH$_2$Cl.

EXAMPLE 29

Example 26 is repeated except that 1,464 grams of the distilland product mixture of Example 9 is added to the reaction flask. The product of this example is a mixture similar to the product mixture of Example 14 except that one terminal group is

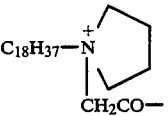

and the remaining terminal group is the same or is hydrogen or —COCH$_2$Cl.

EXAMPLE 30

Example 26 is repeated except that 3,868 grams of the distilland product mixture of Example 10 is added to the reaction flask. The product of this example is a mixture similar to the product mixture of Example 15 except that one terminal group is

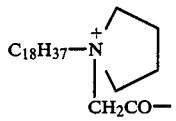

and the remaining terminal group is the same or is hydrogen or —COCH$_2$Cl.

EXAMPLE 31

Example 11 is repeated except that 879.0 grams of the tertiary amine having the formula

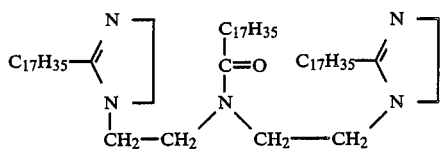

is substituted for lauryl dimethyl amine. The product of this example is a mixture of compounds similar to those described for Example 11 except that one terminal group is

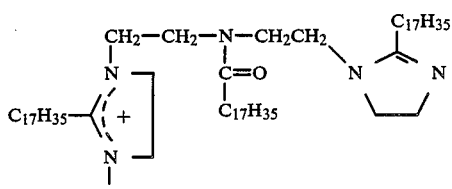

and the remaining terminal group is the same or is hydrogen or —COCH$_2$Cl, i.e. a mixture of compounds having the formula:

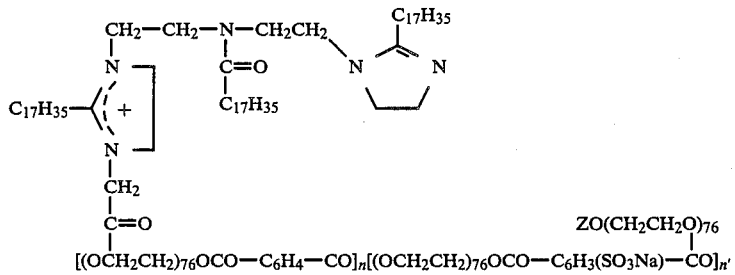

where the sum of n+n' is 10 and Z is H, —COCH$_2$Cl or

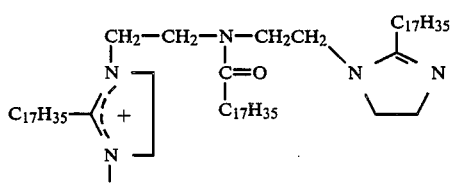

and where, in one of the compounds, n and n' are each 5 and Z is

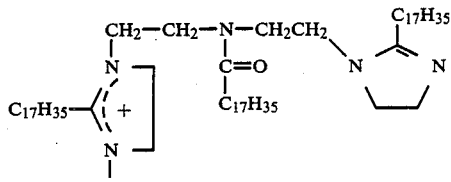

EXAMPLE 32

A bleached, scoured 13×13 inch sample of white single knit polyester fabric was pretreated by washing with a standard phosphate detergent, AATCC Detergent 124, in a Kenmore washer at 140° F., normal cycle. The fabric was then dried in a Kenmore dryer for 30 minutes (normal cycle) and conditioned at 70° F., 65% relative humidity for 2 hours.

A dispersion of 2.0 gram of the compound to be tested, 0.25 grams of sodium dioctyl sulfosuccinate and 200 gram of water was prepared in a beaker. The condtioned fabric was added to the beaker and mixed with a magnetic stirrer. The dispersion was then heated to 160°–170° F. for 0.5 hour after which the fabric was squeezed out and dried in a Kenmore dryer for 30 minutes. The fabric was then soiled with a mixture of nujol, Wesson oil, heavy motor oil and mustard and rewashed under the above conditions (160°–170° F.). After washing and drying, the soil release properties were tested using the standard AATCC 130 detergent and test method. The soil release and softening properties of the test materials were evaluated on a scale of from 1 to 5 and results of this evaulation are reported in following Table I.

TABLE I

| Material | Soil Release Rating | Softening |
| --- | --- | --- |
| Untreated | 1.0 | 1.0 |
| MILASE T | 3.5 | 2.0 |
| Test Compound of Example 25 | 4.0 | 4.0 |
| Test Compound Of Example 21 | 3.5 | 3.5 |
| Test Compound of Example 18 | 4.5 | 4.5 |
| stearyl dimethyl benzyl ammonium chloride | 1.0 | 3.5 |

Many alterations and variations in the above examples will become apparent to those skilled in the art from the above description and disclosure without departing from the scope of this invention. For example, any of the present cationic polymeric mixtures can be substituted in the above test examples to provide similar benefit.

What is claimed is:

1. A mixture of cationic benzene carboxylate polymers having the formula

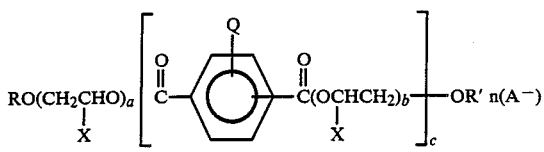

wherein R and R' are selected from the group consisting of alkyl or alkenyl having from 1 to 20 carbon atoms, aryl,

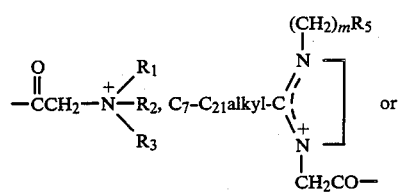

with the proviso that at least one of R and R' is quaternized;

Q is hydrogen, $SO_3$-alkali metal, $SO_3H$, COOH or COO-alkali metal, at least 25% of Q in said mixture being hydrogen;

a and b each have a value of from 1 to 200, except that the sum of a+b is at least 25;

X is hydrogen, lower alkyl or mixtures thereof in random or block distribution when a and/or b is greater than 3;

c has a value of from 2 to 10,000;

$R_1$, $R_2$ and $R_3$ each contain from 1 to 22 carbon atoms and are alkyl, hydroxy alkyl or alkylamido lower alkyl;

$R_5$ is

—OH, —$OCOR_1$ or —$OR_1$;

$R_6$ is hydrogen or —$COR_1$;

$R_7$ is hydrogen, —$(CH_2)_mOCOR_1$, —$(CH_2)_mOR_1$, —$(CH_2)_mNH_2$,

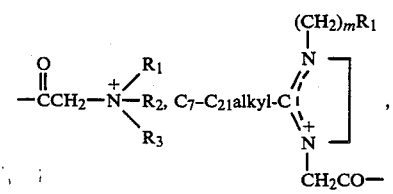

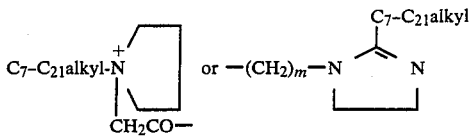

m has a value of from 0 to 3;

A is a halide, sulfonate, sulfate or alkali metal anion and n has a value equal to the number of quaternized nitrogen atoms in the molecule.

2. The mixture of claim 1 wherein c has a value of from 50 to 5,000, the identity of X corresponds to the radical obtained from the polymerization of a mixture of ethylene oxide and propylene oxide in random or block distribution and a and b each have a value of from 50 to 100.

3. The mixture of claim 2 wherein A is Cl.

4. The mixture of claim 1 wherein both R and R' are quaternized.

5. The mixture of claim 4 wherein R and R' are

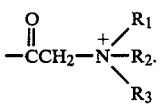

6. The mixture of claim 4 wherein R and R' are

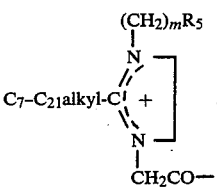

7. The mixture of claim 1 wherein one of R and R' is quaternized.

8. The mixture of claim 7 wherein one of R and R' is

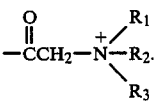

9. The mixture of claim 7 wherein one of R and R' is

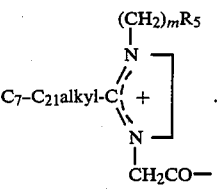

10. The mixture of claim 1 wherein Q is a mixture of hydrogen and an —$SO_3$ moiety and the ratio of H to —$SO_3$ moiety is between about 2:1 and about 1:10.

* * * * *